Nov. 3, 1936.    M. H. TUFT    2,059,419
WHEELED VEHICLE
Filed June 15, 1934    2 Sheets-Sheet 1
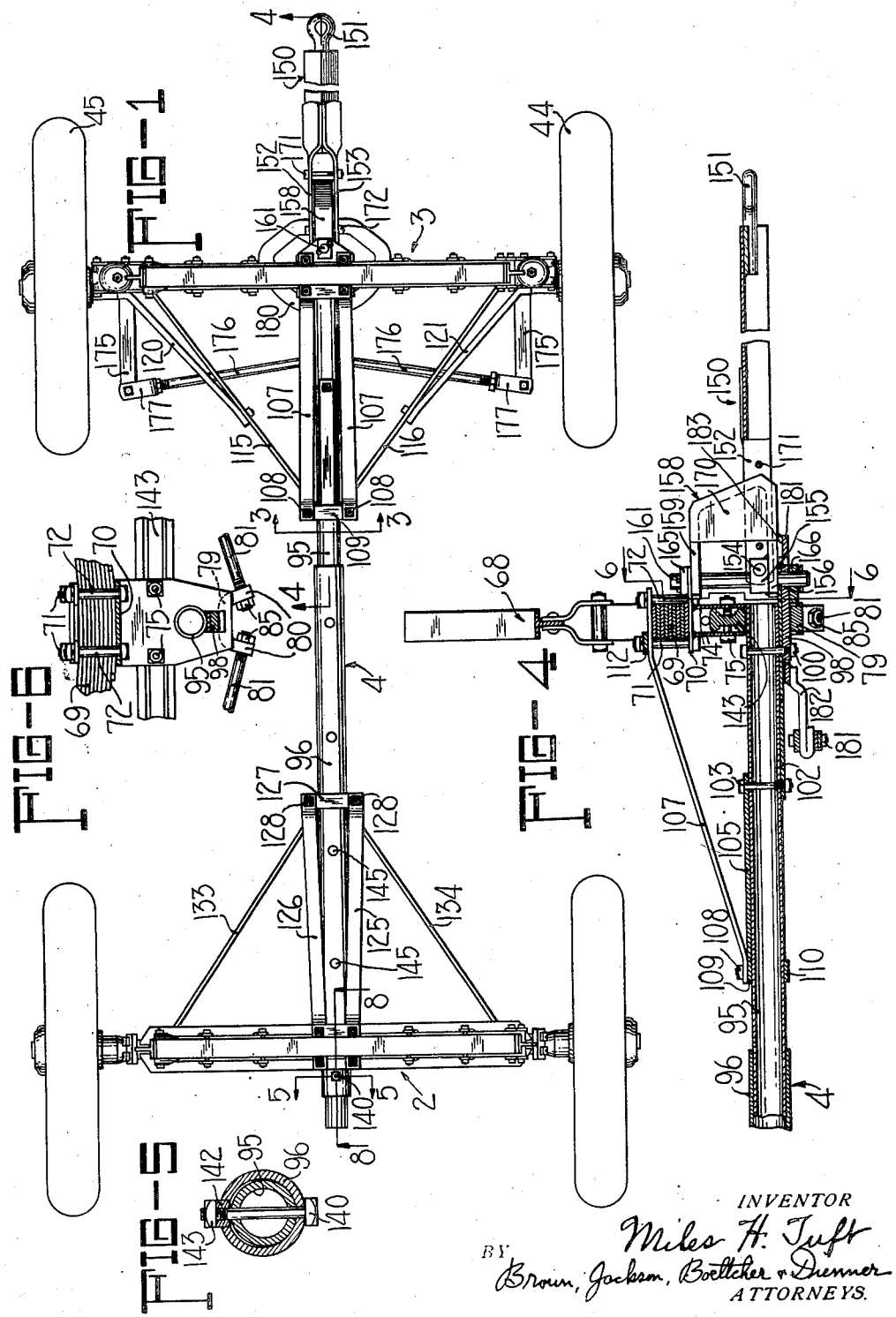
INVENTOR
Miles H. Tuft
BY
Brown, Jackson, Boettcher & Dienner
ATTORNEYS.

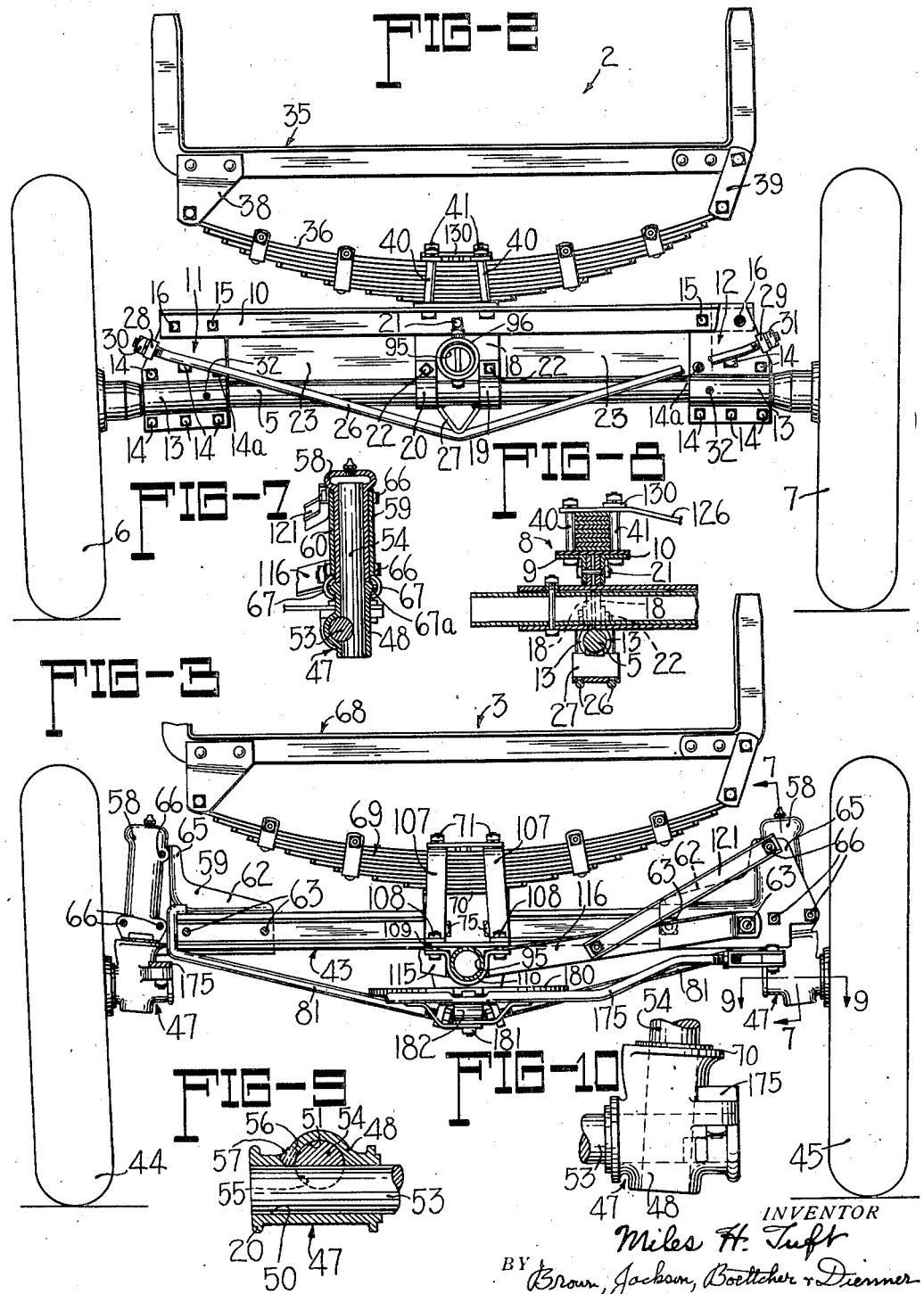

Patented Nov. 3, 1936

2,059,419

UNITED STATES PATENT OFFICE 2,059,419

WHEELED VEHICLE

Miles H. Tuft, Rock Island, Ill., assignor to Deere & Company, Moline, Ill., a corporation of Illinois Application June 15, 1934, Serial No. 730,758

10 Claims. (Cl. 280—80)

The present invention relates generally to wheeled vehicles and the like, and particularly to running gears for wheeled vehicles such as trailers, wagons and similar vehicles.

The principal object of the present invention is the provision of a new and improved reach pole construction by which the front and rear gears are connected together for relative angular displacement about a generally longitudinal axis, whereby the vehicle can easily accommodate itself to ground and road irregularities without the use of loosely connected parts which are likely to wear, rattle, or lose their position or adjustment.

In running gears for trailers, wagons and the like, employing four wheels as distinguished from trailers and vehicles of the cart type employing two wheels, it is necessary that the front running gear be able to rotate about a generally longitudinal axis with respect to the rear gear. Heretofore, it has been proposed to provide this required relative rotation by making the reach pole in two sections, one fixed to each gear and the two sections being connected together for rotation one with respect to the other, as by making both sections of tubular cross section with one disposed within and adapted to rotate relative to the other. However, under certain conditions such constructions have been found to be objectionable, especially when used in trailers and the like designed for high speed operation, for under these conditions, the connection between the two reach pole sections, by which the required relative rotation is secured may become a source of annoying rattles, especially after the connection becomes worn.

With these features in mind, the principal object of the present invention is, specifically, the provision of a two-section reach pole, each being of tubular cross section and one telescoping within the other, the section of smaller cross section being made longer than the other and extending from one end of the vehicle to the other end thereof, with the smaller reach pole section being fixedly connected to the larger reach pole section in which it is disposed, such fixed connections being rigid and permanent. By virtue of such construction, the required relative rotation of one gear with respect to the other is obtained in the torque deflection of the reach pole section of smaller diameter. In its more generic aspects, this feature of the present invention may be embodied in any reach pole construction in which reliance is placed upon the torque deflection of the reach member to provide the required permissive relative rotation between the front and rear gears. In utilizing the torque deflection to secure the required relative movement, the reach pole may be fixedly or rigidly connected to both the front and rear gears so that there will be no chance for looseness, rattles and the like to develop. In the preferred construction, which will be specifically described later, one gear may be rotated about the longitudinal axis of the vehicle with respect to the other gear through an angle of approximately 45° without stressing the torsionally yieldable reach pole construction beyond its elastic limit.

Another important object of the present invention resides in certain new and improved construction of the rear gear. Specifically, it is the object of the present invention to provide a rear gear which comprises an axle and a rigid member connected therewith at the ends of the axle, in connection with suitable bracing or tensioning means by which the axle may be deflected a limited amount so as to give the rear wheels, journaled for rotation on the ends of the axle, the required pitch. Specifically, it is the object of the present invention to provide brackets which are, at least during assembly, pivotally connected with the rigid member but which are connected with the axle in such a way that angular displacement between the brackets and the axle is not permitted, in connection with means for swinging the brackets with respect to their pivotal connection with the rigid member so as to deflect the outer ends of the axle for the purpose of giving the rear wheels the required pitch. Preferably, although not necessarily, the rigid member is disposed in parallelism with respect to the axle itself. The present invention also contemplates permanently and rigidly connecting the brackets to the rigid member and to the axle after the latter has been deflected the desired amount to give the rear wheels the proper positioning. In another aspect of this feature of the present invention, it is an object thereof to provide suitable tensioning means arranged to react against the ends and the intermediate portion of the axle so as to be capable of deflecting or bending the axle to give the end portions thereof the proper angle to provide the desired pitch for the wheels journaled on the axle ends.

A further important object of the present invention is a new and improved manner in which the vertical spindles for the front wheels of the vehicle are connected with the front axle or the front gear. Preferably, the vehicle or trailer is of the short-turn automobile type in which the front wheels are separately connected with the ends of the rigid front axle for movement about vertical axes, the wheels being steered by any suitable means. In this connection it is the object of the present invention to provide a front wheel assembly which permits the use of cold rolled stock for the stub axle, upon which the front wheel is journaled, and the spindle, by which the front axle assembly is journaled in the sleeve or knuckle piece carried by or formed on the front axle beam. Preferably, each front wheel assembly includes a casting having two borings disposed at substantially right angles and in which the axle and the spindle are respectively disposed. According to the present invention, a slot intersecting these two angularly related borings is provided in the casting so that by providing a weld in this slot, the casting and the two cold rolled shaft sections are connected together to form a rigid unit. This makes for a very inexpensive assembly in that, as stated, it permits the use of cold rolled stock for the axle and the spindle. Cold rolled stock obtained on the open market runs sufficiently close to the specified diameters so that it is unnecessary to further machine the axle or the spindle, which would be a necessary operation if the front wheel assembly were formed of other means, as for example a single forging.

In a running gear of the class referred to above, a further object of the present invention is the provision of new and improved front gear construction in which the sleeve or bearing members, in which the front wheel spindles are journaled, are connected to the front beam by plates or the like which serve the additional purpose of or are provided with additional means for holding the front wheel spindles in proper position. Specifically, the front gear comprises a beam to each end of which a substantially vertically disposed bearing member or sleeve is fixed by means of a pair of plates bolted to opposite sides of the beam and the sleeve. Each plate is provided with an inwardly extending lug adapted to extend below a flange on the casting of the spindle assembly referred to above to hold the spindle in position in the sleeve.

Still further, another object of the present invention is the provision of new and improved means for connecting the pole to the front gear. Specifically, the present invention is concerned with the provision of a member which is connected with the central portion of the front gear for movement about a vertical axis in between two laterally spaced arms which are pivoted for movement about a generally vertical axis and which are extended rearwardly and connected with the front wheels to steer the same.

Still further, another object of the present invention is the provision of an improved truck or gear construction, particularly concerned with those employing spring supported bolsters and the like, and it is the specific object of the present invention in this connection to provide suitable diagonal braces extending from the reach pole construction to the axle beam and, in addition, generally longitudinally extending brace means which connects to the reach pole construction and to the anchored portion of the bolster supporting spring means. By virtue of this construction, both the reach pole and the bolster spring are properly braced to the running gear.

These and other objects and advantages of the present invention will be apparent to those skilled in the art after a consideration of the following detailed description of the preferred construction, taken in conjunction with the accompanying drawings forming a part of this specification.

In the drawings:

Figure 1 is a top plan view of the running gear or chassis of a vehicle embodying the principles of the present invention;

Figure 2 is a rear view, looking forwardly, of the vehicle illustrated in Figure 1;

Figure 3 is a view taken along the section line 3—3 of Figure 1 and looking in the direction of the arrows;

Figure 4 is a section taken along the line 4—4 of Figure 1;

Figure 5 is a section taken along the line 5—5 of Figure 1;

Figure 6 is a section taken along the line 6—6 of Figure 4;

Figure 7 is a section taken along the line 7—7 of Figure 3;

Figure 8 is a section taken along the line 8—8 of Figure 1;

Figure 9 is a section taken along the line 9—9 of Figure 3; and

Figure 10 is a fragmentary view of the front wheel axle and spindle assembly illustrated as viewed from the rear of the vehicle.

Referring now to the drawings, the wheeled vehicle with which the present invention is concerned has been illustrated as in the form of a trailer or wagon which comprises a running gear having a rear truck or gear 2 and a front truck or gear 3 connected together by a telescopic reach pole construction indicated in its entirety by the reference numeral 4. Referring first to the rear gear 2, best shown in Figure 2, it will be seen that this part comprises an axle 5 on the outer ends of which there are rear supporting wheels 6 and 7 journaled by any suitable form of bearing means. Disposed above the axle 5 but parallel with respect thereto is a rigid member 8 which is formed of preferably two angle irons 9 and 10, as best shown in Figure 8. The member 8 is disposed an appreciable distance above the axle 5 but has its ends connected with the shaft 5 by suitable bracket means 11 and 12. Each bracket means is made up of a pair of plates each of which has a semi-cylindrical recess 13 formed in the lower end thereof, the two recesses of each pair forming a cylindrical opening for receiving the axle 5. The plates of each pair are rigidly bolted together and clamped around the axle 5 by means of a plurality of bolts 14 and a bolt 14a which passes through a reenforcing plate that will be referred to later. At their upper ends the plates forming the brackets 11 and 12 are bolted to the angle members 9 and 10 by means of bolts 15 and 16, these bolts also serving to secure the two angle members 9 and 10 rigidly together at their ends.

At its central portion, the axle 5 is connected to the angles 9 and 10 by a pair of plates 18 which are disposed between the vertical legs of the angles 9 and 10, as best shown in Figure 8, and rigidly connected therewith by means of a bolt 21. A pair of straps 19 and 20 embrace the shaft 5 and are securely bolted to the lower ends of the plates 18 by means of bolts 22 or the like. A filler plate 23 is disposed between the rigid member 8, comprising the angles 9 and 10, and the axle 5, and the filler plate 23 is positioned with its outer ends between the plates forming the brackets 11 and 12. At its inner ends the filler plate 23 extends between the plates 18. As best shown in Figure 2, the outer portions of the filler plate 23 extends laterally outwardly as far as the bolts 14a and 16. The filler plate 23 improves the appearance of the rear axle and, at the same time, provides additional rigidity to the rear gear.

The rear gear is braced by truss means which not only strengthens the axle but at the same time provides for adjusting the pitch of the rear wheels 6 and 7. The truss means consist of a pair of truss rods 26, one disposed on each side of the axle 5, and these rods bear against an abutment member 27 disposed in the center of the axle 5. Preferably, the abutment 27 is in the form of a triangular piece welded to the inner sides of the straps 19 and 20, but if desired the abutment 27 may be welded to the axle or may be formed as an integral part of one or both of the straps 19 and 20. The truss rods 26 extend outwardly and upwardly from the abutment block 27 and have their ends extending through perforations in brackets 28 and 29 which rest in recesses provided for them in the outer edges of the plates forming the vertical brackets 11 and 12. The ends of the truss rods 26 are threaded and provided with adjusting nuts 30 and 31 by which the truss rods may be tensioned. When the nuts 30 and 31 are tightened the truss rods 26 react against the brackets and bear upwardly against the central portion of the axle 5, thus strengthening the rear gear.

The truss rods 26 also serve as means for giving the rear wheels 6 and 7 the proper pitch, although in the arrangement shown whenever the truss rods 26 are tightened, the central portion of the rear axle 5 is deflected upwardly so that the mere act of tightening the truss rods increases the pitch of the rear wheels slightly. However, in the process of assembling the rear gear, the parts are connected as described above but the bolts passing through the plates forming the brackets 11 and 12 are left loose. The holes in the bracket plates 11 and 12 for the bolts 14a and 16 are purposely made somewhat larger than the diameter of the bolts so that there is some permissive pivoting of the brackets 11 and 12 about the inner bolts 15 whenever the nuts 30 and 31 on the truss rods 23 are tightened. Thus, as will be clear from Figure 2, tightening the truss rods 26 causes the bracket 11 to swing slightly in a counterclockwise direction and the other bracket 12 to swing in a clockwise direction. This angular movement of the brackets 11 and 12 causes the lower portions thereof, that is, the portions which embrace the axle 5, to shift inwardly a slight amount on the axle 5, but by virtue of the lower portions 13 of the plates being formed to snugly embrace the axle 5, the outer ends of the axle are deflected downwardly when the brackets 11 and 12 are pivoted in the manner mentioned. Whenever the nuts 30 and 31 have been tightened enough to give the rear wheels 6 and 7 the proper pitch, the bolts 14, 14a, 15 and 16 are then firmly tightened and, in addition, the plates forming the brackets 11 and 12 are rigidly fixed to the axle 5, preferably by welding the plates thereto through holes 32 provided for that purpose.

Even though the rear wheels 6 and 7 are given the proper pitch by first having the brackets loosely engage the axle and pivoting the brackets about the inner bolts 15, as provided for by the above described construction, after the brackets are firmly secured to the axle 5 as by tightening the bolts and by welding as described, it is also possible to further adjust the pitch of the rear wheels at any time by tightening or loosening the nuts 30 and 31. For example, tightening the nuts 30 and 31, even after the brackets 11 and 12 are rigidly secured in place, will exert an upwardly directed force against the abutment 27 which will cause the axle 5, as well as the angle members 9 and 10, to bend upwardly.

A bolster 35 is provided for supporting the bed or body of the trailer and is preferably formed of a single piece of T-bar stock. The bolster 35 is supported on a transversely disposed semi-elliptic spring 36, one end of which is fixed to a pair of brackets 38 carried by the bolster, and the other end of the spring 36 is connected to the other end of the bolster by means of a swinging shackle 39. The central portion of the spring 36 is bolted to the top of the axle member 8 by means of bolts 40 and 41 disposed on opposite sides of the spring and passing through holes in the flanges of the angle members 9 and 10. The upper threaded ends of the bolts 40 and 41, as best shown in Figure 8, pass through the rear ends of straps which will be referred to later but which are such that when the bolts are tightened, the central section of a spring 36 is rigidly fastened to the angle members 9 and 10 forming the member 8.

The front gear, best shown in Figures 3 and 4, comprises a transverse beam 43 which is preferably formed of plow beam stock and is supported at its outer ends on a pair of dirigible wheels 44 and 45. Each of the front dirigible wheels includes or is connected with the associated end of the front axle beam 43 by a shaft and spindle assembly 47, the details of which are best shown in Figures 9 and 10. Each shaft and spindle assembly 47 comprises a casting 48 which is provided with two cored cylindrical openings 50 and 51 disposed substantially at right angles with respect to one another. These angularly disposed openings in the casting 48 are adapted to receive shaft sections, preferably of cold rolled stock of the required dimensions, which serve as the stub shaft on which the associated dirigible wheel is journaled and as the spindle which is received by suitable means carried by the front axle. The stub shaft section is indicated by the reference numeral 53 and the spindle section is indicated by the reference numeral 54, the latter being recessed, as at 55, (Figure 9) to receive the stub shaft section 53. It has been found that by employing cold rolled stock for the stub shaft and spindle sections, no machining is necessary.

A slot 56 is provided in the casting 48 in such a position that it intersects the two bores receiving the shaft sections 53 and 54, as best indicated in Figure 9, and when these sections are properly positioned in the casting 48, the three members 48, 53 and 54 are welded together, the slot 56 being filled up with the weld, as shown at 57 in Figure 9. Thus, at one operation, the shaft and spindle assembly 47 is rigidly and permanently connected together as one integral unit.

Each of the spindle sections 54 is received within suitable sleeve means carried by the front axle beam 43, thereby providing a construction by which the front wheels may pivot about generally vertical axes to steer the vehicle. One advantage of this construction is that it allows an exceptionally short easy turn, and if the vehicle is to be drawn by draft animals, they are assisted greatly on rough and rutted roads by the elimination of pole whip. The sleeve member receiving each of the spindle sections 54 is indicated in Figure 3 by the reference numeral 58, this member consisting of a tubular member of generally cylindrical construction having a closed upper end and a lower open end. A sleeve 58 is adapted to be fixed to each end of the front axle beam 43, as by means of a pair of plates 59 and 60, one being disposed on either side of the beam 43 and the sleeve 58 as best indicated in Figure 7. The plates are provided with laterally inwardly disposed sections 62 which are formed to embrace the ends of the front axle beam 43, being bolted thereto by bolts 63. Each of the plates 59 and 60 also include a generally vertically disposed section 65, and these sections are formed to embrace, at least partially, the associated sleeve 58 and are bolted thereto by bolts 66. Each plate of the pair of plates 59 and 60 is provided with an inwardly bent lug 67 (Figure 7) which is adapted to engage below a flange 67a formed on the casting 48 for the purpose of holding the axle and spindle assembly 47 in position, particularly to prevent the assembly 47 from dropping out of the associated sleeve 58.

A bolster 68, similar to bolster 35 for the rear gear 12, has been provided for the front gear 3 and is supported in a similar manner on a transversely disposed leaf spring 69 which rests upon and is bolted to a plate 70 by means of bolts 71 and 72, best shown in Figure 4. The plate 70 is welded to the upper ends of a pair of plates or brackets 74 disposed on opposite sides of the front axle beam 43 and securely bolted thereto by a pair of bolts 75. Preferably, the vertical plates 74 include sections extending below the front axle 43, as best indicated in Figure 6, and to the lowermost portions of the plates 74 a U-shaped bracket 79 is welded and is provided with arms 80 which receive the inner threaded ends of truss rods 81. These truss rods extend upwardly and laterally outwardly and have outer ends disposed between the pairs of plates 59 and 60 and are bent to hook over the ends of the front axle 43, as best shown in Figure 3. Nuts 85 are provided to give the proper tension to the truss rods 81.

The reach pole construction 4 which connects the front and rear running gears together comprises two telescopically associated reach pole sections 95 and 96. Preferably these sections are of tubular pipe stock, and the outer diameter of the section 95 is slightly smaller than the inner diameter of the rear section 96 to provide for the telescopic association mentioned. The section 95, hereinafter referred to as the forward section because it is connected with the front gear, is fixed at its front end to the forward gear 3 and has its forward end extending through perforations in the lower portions of the plates 74 and is disposed below the front axle beam 43, as best shown in Figures 4 and 6. In order to fix the forward end of the forward section 95 to the front gear 3 a bar 98 is disposed in openings in the lower sections of the plates 74 and is welded to the U-shaped bracket 79, as best shown in Figure 6. If desired, the bar 98 may also be welded to the plates 74 directly. The rear end of the bar 98 is provided with a suitable opening to receive a bolt 100, and this bolt is utilized in securely fixing the forward end of the reach pole section 95 to the front gear, as best shown in Figure 4. Secured to the lower portion of the forward reach pole section 95 is a reenforcing strap 102 which may be bolted to the reach pole section 95. The bolt 100 passes through the reenforcing strap 102 and a second bolt 103 disposed in the forward portion of the reach pole section 95 also passes through the reenforcing strap 102 and the forward end of a second reenforcing strap 105 which may also be bolted to the reach pole section 95 if desired.

The forward reach pole section 95 is braced to the front gear 3 by means of a pair of upwardly and forwardly extending braces 107 secured, as by bolts 108, to a short transverse top plate 109, as best shown in Figures 1 and 2. A U-shaped strap 110 embraces the reach pole section 95 and has its upper ends secured in place by the bolts 108. Preferably, the rear end of the reenforcing strap 105 is welded to the plate 109. The forward ends of the braces 107 are bolted to the top of the front spring 69 by means of the bolts 71 and 72, the forwardmost ends of the braces 107 having apertures to receive these bolts so that when they are tightened both the braces 107 and the spring 69 are securely fastened to the front gear 3. In addition, a spacer 112 is associated with the rear bolts 71 and serves to hold the braces 107 in proper position.

The forward pole section 95 is further braced to the front gear 3 by means of forwardly and laterally outwardly extending braces 115 and 116 which are connected at their forward ends to the outer bolts 63 at the ends of the front axle beam 43. At their inner ends the braces 115 and 116 are welded, as best shown in Figure 3, to the U-shaped bracket 110. Auxiliary braces 120 and 121 are connected between the braces 115 and 116, intermediate the ends thereof and the upper bolts 66, by which the pairs of plates 59 and 60 are connected toegther and to the upper portions of the sleeves 58.

The rear reach pole section 96 is fixedly connected to the rear running gear 2 by a construction somewhat similar to that described above for the front gear 3. The rear end of the rear pole section 96 extends through perforations in the plates 18, as best shown in Figures 2 and 8, and preferably the rear pole section 96 is welded to these plates. The rear reach pole section is braced by a pair of upwardly and rearwardly extending braces 125 and 126 which are fixed at their forward ends to a short transverse bar 127, as by bolt means 128, which is also utilized to secure thereto the ends of a U-shaped member which embraces the rear reach pole section 96 and is otherwise positioned in a manner similar to the U-shaped bracket 110 associated with the forward bracing structure. At their rear ends the braces 125 and 126 are connected to the top of the rear spring 56 by the bolts 40 and 41, the rear sections of the braces 125 and 126 receiving both of these bolts, as best shown in Figure 8. A spacer 130 is associated with the bolts 41. The rear pole section 96 is further braced by means of a pair of braces 133 and 134, welded at their forward ends to the U-shaped bracket embracing the reach pole section 96 and secured in place by the bolts 128, and the rear ends of the diagonal braces 133 and 134 are connected to the upper spindle bolts 14 extending through the pairs of plates 11 and 12.

The tubular reach pole sections 95 and 96 are connected together at their rear ends by means of a bolt 140, or the equivalent, which is disposed in aligned perforations in the reach pole sections. In order that the two sections may be clamped rigidly together the upper perforation in the reach pole section 96 is made large enough to receive a bushing 142 which is forced tightly down upon the upper side of the inner forward pole section 95 by any suitable means, as by a nut 173. The section 96 is provided with additional openings, indicated by the reference numeral 145, in which the bolt 140 may be disposed to lengthen the wheel base of the trailer.

The trailer is drawn and steered through a tongue 150 which is formed of angle iron stock and has an eye 151 welded to its forward end. The tongue 150 is also provided with two laterally spaced rearwardly extending arms 152 and 153 which are pivoted for vertical swinging movement on trunnions 154 formed on a block 155 which is welded to the inner face of the lower arm 156 of a U-shaped, generally vertically disposed member 158 which is provided with an upper arm 159. The member 158 is pivoted for generally laterally swinging movement by means of a vertically disposed pin 161 which passes through perforations in the upper and lower arms 159 and 156 and is carried by the front gear, as best shown in Figure 4. Preferably, the pivot pin 161 passes through perforations provided in the plate 70 and a reenforcing block 165 welded thereto, and through perforations in the forward end of the plate 98 and a block 166 welded to the under side of the latter. Cotter pins, or the equivalent, are provided at the upper and lower ends of the pivot pin 161 to hold the latter in position.

The vertically disposed U-shaped member 158, to which the tongue 150 is pivotally connected, is provided with a pair of vertically disposed rub plates 170 secured on opposite sides of the member 158, and the arms 152 and 153 are adapted to have sliding engagement with these rub plates. The distance between the arms 152 and 153 may be adjusted to take up any looseness or play which may occur between the arms and the rub plate, due to wear or the like, and to this end adjusting bolts 171 and 172 are provided and may be tightened to bring the arms 152 and 153 closer together as the need for adjustment arises. It will be observed that, although the tongue 150 has pivotal movement with respect to the member 158, the latter swings laterally with the tongue about the axis defined by the pivot pin 161 when the tongue 150 is swung laterally.

The front dirigible wheels are steered through connections which are actuated by lateral movement of the tongue 150. Each front wheel axle and spindle assembly 47 includes a rearwardly disposed steering arm 175, and to these steering arms 175 there is connected a link or tie rod 176, as by any form of connection, such as adjustable yokes 177. The central portion of the link 176 is connected to a ring 180 by bolt means 181, the latter being carried by an arm 182 welded or otherwise fixedly secured to the rear portion of the ring member 180, and the latter is welded, together with a filler block 183, to the under side of the lower arm 156 of the member 158. The bolt 181 also passes through a clip 184 secured to the central portion of the link 175.

When the tongue 150 is swung laterally, the U-shaped member 158, carrying the ring member 180, is likewise swung about the same axis, and since the tie rod means 176 is connected with the ring member 180, the front wheels 44 and 45 are caused to be steered, but, by virtue of the rub plates 170 and the embracing arms 152 and 153, vertical oscillations of the tongue 150 do not have any effect upon the steering of the vehicle.

When the vehicle traverses uneven ground and the points of contact of the supporting wheels do not lie in the same plane so that the forward gear is displaced angularly about a generally longitudinal axis with respect to the rear gear, this relative displacement is provided for by the reach pole section 95 yielding in torsion, and the torsional yieldability of the latter is established by the fact that the member 95 is of appreciable length and is rigidly connected at its forward end to the front gear and at its rearmost end to the rear gear, the space between the points of connection being sufficient to provide the required torsional deflection. Since the connections at the points mentioned are rigid and permanent there is no likelihood of any weaving of the trailer or of rattles developing at this point, and since there is no relative movement at these points of connection, no wear can occur.

While I have shown and described above the preferred embodiment in which the principles of the present invention have been illustrated, it is to be understood by those skilled in the art that my invention is not to be limited to the specific means shown and described but that, in fact, widely different means may be employed in the practice of the broader aspects of my invention.

What I claim, therefore, and desire to secure by Letters Patent is:

1. In a gear construction for a wheeled vehicle, a beam, a wheel supporting assembly including a spindle receiving sleeve and spindle means carried thereby, a pair of plates fixed to said beam and embracing said sleeve on opposite sides thereof to fix the sleeve to the beam, and means on at least one of said plates for holding the spindle means in position in said sleeve.

2. In a gear construction for a wheeled vehicle, a beam, a stub axle upon which a wheel is journaled, a spindle fixed to said stub axle, a bearing member in which said spindle is journaled, a flange on said spindle bearing against one end of said bearing member, a pair of plates fixed to opposite sides of said beam at one end thereof, and to said bearing member to fix the latter to the beam, and a lug on each plate embracing said flange to hold said spindle in position.

3. In a gear construction for a wheeled vehicle, a beam, a wheel supporting assembly including a spindle receiving sleeve and spindle means carried thereby, a pair of plates fixed to opposite sides of said beam at one end thereof and to opposite sides of said sleeve to fix the latter to the beam, bracket means disposed on the underside of said beam near the center thereof, and truss means reacting against said bracket means and having ends hooked over the ends of said beam and in between the plates of each pair.

4. In a gear construction for a wheeled vehicle, a beam, a wheel supporting assembly comprising a casting having a wheel receiving stub axle and a generally vertically disposed spindle section, a spindle receiving sleeve embracing said spindle section and engaging said casting, a pair of plates fixed to opposite sides of said beam and each plate including a generally semi-circular vertical portion adapted to partially embrace said spindle receiving sleeve, and means for clamping said plates to said beam and around said spindle receiving sleeve so as to securely fix the latter to the end of the beam.

5. In a gear construction for a wheeled vehicle, a beam, a stub axle upon which a wheel is journaled, a spindle fixed to said stub axle, a bearing member in which said spindle is journaled, a flange fixed to said spindle and bearing against one end of said bearing member, a pair of plates fixed to opposite sides of said beam and to said bearing member to fix the latter to the beam, and means on one of said plates engaging said flange to hold said spindle in position.

6. In a gear construction for a wheeled vehicle, a beam, a wheel supporting assembly including a spindle receiving sleeve, a pair of plates fixed to opposite sides of said beam at one end thereof and to said sleeve to fix the latter to the beam, bracket means disposed on the underside of said beam near the center thereof and including a U-shaped member having downturned ends disposed in the plane of said beam between said plates, and a pair of truss members also disposed in said plane, each including a bent laterally outer end hooked over one end of said beam and disposed between the plates at said end, the other end of each of said truss members being adjustably connected with the downturned ends of said U-shaped bracket member.

7. In a gear construction for a wheeled vehicle, an axle assembly including a transversely disposed beam, a pair of plates secured on opposite sides to each end of said beam, wheel supporting means disposed between each pair of plates, bracket means disposed on the under side of the beam near the center thereof and in the vertical transverse plane that passes through the plates of each of said pairs of plates, said bracket means including a generally transversely arranged U-shaped member having apertured ends disposed in said plane, and a pair of truss rods extending transversely in said plane, each having a threaded inner end disposed in the apertures of said U-shaped bracket member and a bent outer end hooked over the associated end of said beam and between the adjacent pair of plates secured thereto.

8. In a gear construction for a wheeled vehicle, an axle assembly including an axle beam, a pair of plates secured on opposite sides to each end of said beam, wheel supporting means disposed between each pair of plates, a third pair of plates disposed on opposite sides of said beam adjacent the center thereof and in the planes, respectively, of said first plates, a U-shaped bracket disposed transversely in alignment with the plane of said beam and disposed between the planes of said plates adjacent the lower ends of the central plates, and truss rods adjustably connected with said transverse bracket member and disposed between the planes of said plates, the truss rods having their outer ends hooked, respectively, over the ends of said beam and in between the end plates carried on opposite sides of the beam.

9. In a gear construction for a wheeled vehicle, an axle assembly including an axle beam, a pair of plates disposed on opposite sides of said beam adjacent the center thereof and extending downwardly therefrom, a U-shaped bracket disposed transversely in alignment with the plane of said beam and disposed between said plates adjacent their lower ends, truss rods adjustably connected with said transverse bracket member and having ends hooked, respectively, over the ends of said beam, and reach pole receiving openings formed in both of said plates between said U-shaped bracket member and said beam.

10. In a gear construction for a wheeled vehicle, an axle assembly including an axle beam, a pair of plates disposed on opposite sides of said beam adjacent the center thereof and extending downwardly therefrom, a U-shaped bracket disposed transversely in alignment with the plane of said beam and disposed between said plates adjacent their lower ends, and truss rods adjustably connected with said transverse bracket member and having end portions secured, respectively, to the laterally outer portions of the axle beam.

MILES H. TUFT.